United States Patent [19]

Sergel et al.

[11] Patent Number: 5,535,799
[45] Date of Patent: Jul. 16, 1996

[54] PNEUMATIC VEHICLE TIRE WITH A SUPPORT FOR REINFORCEMENT ELEMENTS

[75] Inventors: Horst Sergel, Hanover; Heinrich Huinink, Garbsen, both of Germany

[73] Assignee: Continental Aktiengesellschaft, Hanover, Germany

[21] Appl. No.: 173,199

[22] Filed: Dec. 22, 1993

[30]  Foreign Application Priority Data

Dec. 22, 1992 [DE] Germany ............................ 42 43 521.8

[51] Int. Cl.⁶ .............................. B60C 9/02; B60C 17/04
[52] U.S. Cl. ........................... 152/514; 152/520; 152/539; 152/544; 152/548
[58] Field of Search ...................... 152/514, 520, 152/539, 540, 544, 548, 452, 379.5, 380, 387, 394, 395, 1, 5, 11, 12, 13

[56]  References Cited

U.S. PATENT DOCUMENTS

| 1,009,192 | 11/1911 | Sloper | 152/539 |
|---|---|---|---|
| 2,844,180 | 7/1958 | Omeron | 152/520 |
| 4,223,713 | 9/1980 | Ewing | 152/394 |
| 4,231,410 | 11/1980 | Vannan, Jr. . | |
| 4,267,873 | 5/1981 | McColl | 152/339.1 |
| 4,274,465 | 6/1981 | Allbert et al. | 152/380 |
| 4,424,842 | 1/1984 | Trebaol | 152/520 |

FOREIGN PATENT DOCUMENTS

| 1098810 | 4/1981 | Canada . |
|---|---|---|
| 3343890 | 6/1985 | Germany . |

*Primary Examiner*—Geoffrey L. Knable
*Attorney, Agent, or Firm*—Robert W. Becker & Associates

[57]  ABSTRACT

A pneumatic vehicle tire made of rubber or a rubber-like compound has a tire body with two sidewalls and a tread extending between the sidewalls. A carcass is embedded in the tire body and extends from a radially inner edge of a first sidewall to a radially inner edge of a second sidewall. A belt is embedded in the tire body radially inwardly of the tread and radially outwardly of the carcass. A rim-shaped support with fastening elements positioned radially outwardly at the support is provided. The support is connected to the tire body. Reinforcement elements in the form of cords and bands are connected to the fastening elements for forming the carcass. The reinforcement elements extend substantially without deflection from the fastening elements into a neutral bending line of the sidewalls.

15 Claims, 3 Drawing Sheets

PNEUMATIC VEHICLE TIRE WITH A SUPPORT FOR REINFORCEMENT ELEMENTS

BACKGROUND OF THE INVENTION

The present invention relates to a pneumatic vehicle tire that is substantially made of rubber or a rubber-like material with a rim-shaped support as well as a device for building the green tire and a device for vulcanizing the green tire.

The present invention is based on the knowledge that the reinforcement elements that form the carcass, in general, provided in the form of cords, threads, cables, or bands, are always subjected to unfavorable loads when they experience a pressure, push or torsional load in addition to pulling and bending loads. These unfavorable loads occur also within the area of the anchoring of the carcass radially inwardly at the tire as well as within the bead section where bead rings are employed about which the reinforcement elements are guided.

It is therefore an object of the present invention to improve the tires of the aforementioned kind such that the carcass load within the anchoring zones of the tire sidewalls and within the tire sidewalls themselves are practically free of the aforementioned unfavorable loads of the carcass.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
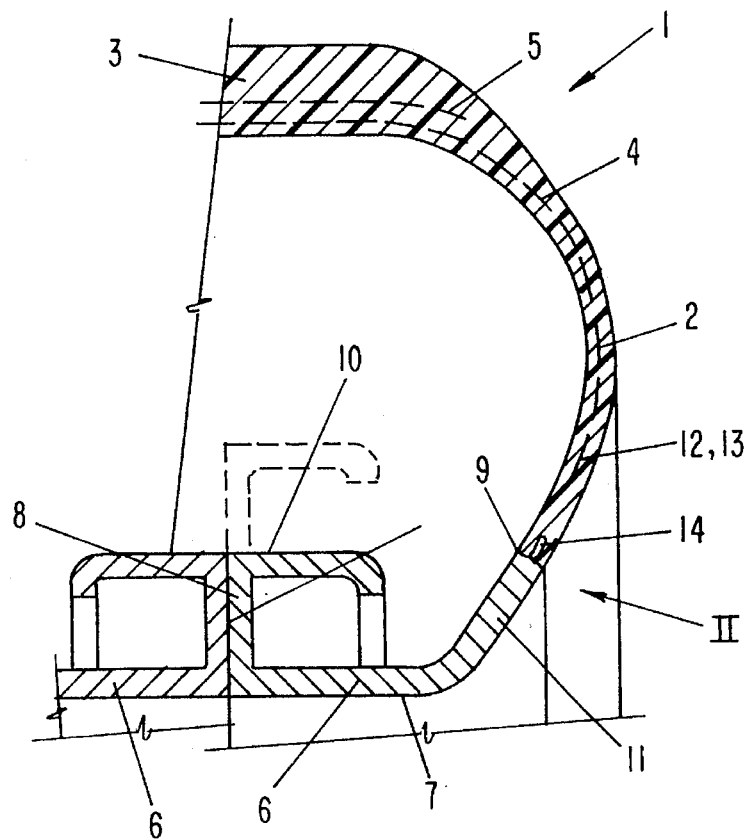
FIG. 1 shows a radial section of a part of a pneumatic vehicle tire with a support.
Figure 2:
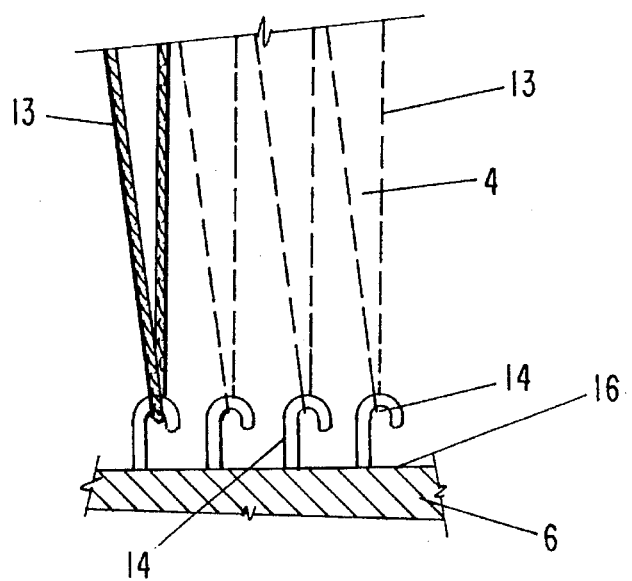
FIG. 2 shows a detail of FIG. 1 viewed in the direction of arrow II wherein the elastic covering layer of the tire body is omitted.
Figure 3:
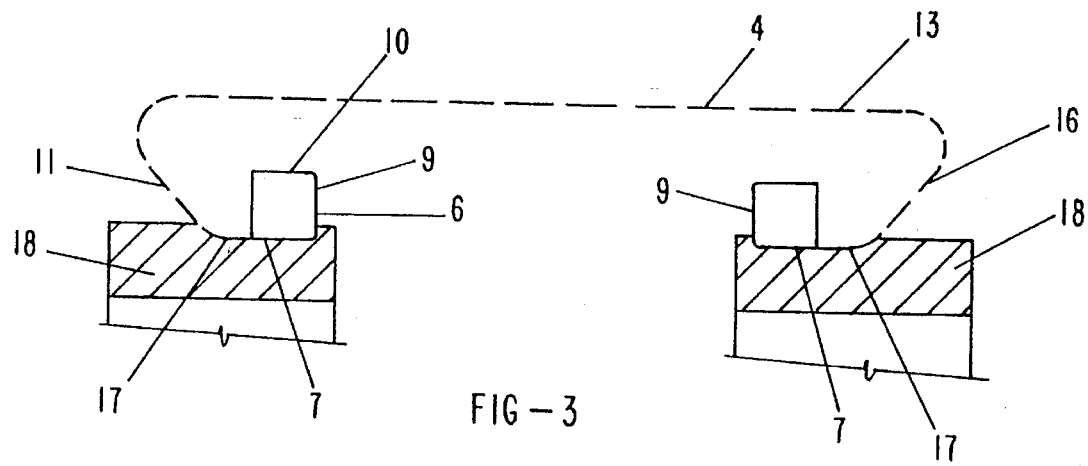
FIG. 3 shows a radial part section of a building device for a tire according to the embodiment of FIG. 1.
Figure 4:
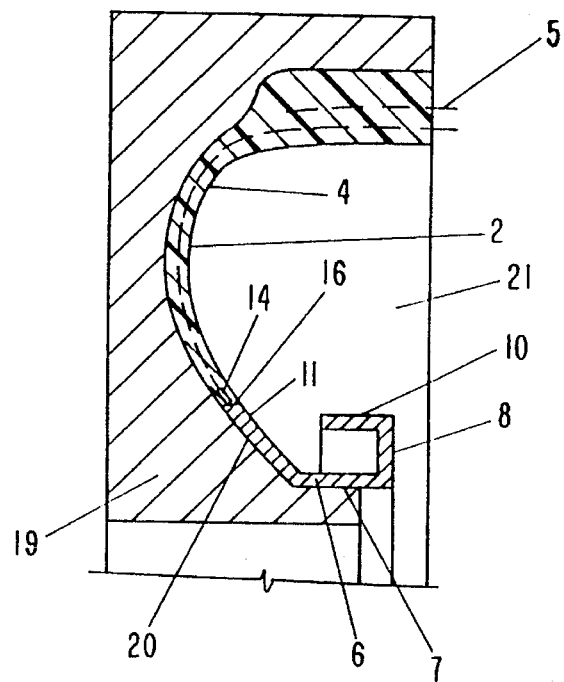
FIG. 4 shows a radial part section of a vulcanization mold for producing a tire according to FIG. 1.

The pneumatic vehicle tire made of rubber or a rubber-like compound according to the present invention is primarily characterized by:

A tire body comprised of two sidewalls and a tread extending between the sidewalls;

A carcass embedded in the tire body and extending from a radially inner edge of a first sidewall to a radially inner edge of a second sidewall;

A belt embedded in the tire radially inwardly relative to the tread and radially outwardly relative to the carcass;

A rim-shaped support with fastening elements positioned radially outwardly at the support, the support connected to the tire body;

Reinforcement elements, selected from the group consisting of cords and bands, connected to the fastening elements for forming the carcass; and The reinforcement elements extending substantially without deflection from the fastening elements into a neutral bending line of the sidewalls.

Preferably, the fastening elements are hook-shaped or eye-shaped.

Advantageously, each fastening element has only one of the reinforcement elements connected thereto.

The reinforcement elements expediently extend substantially radially and the carcass is a single-layer carcass.

Preferably, planes defined by the fastening elements are radial relative to the vehicle tire.

In an alternative embodiment the planes defined by the fastening elements coincide with a plane normal to an axis of rotation of the vehicle tire.

In a preferred embodiment of the present invention, the support has a section extending toward the sidewalls, with the section extending substantially aligned with the neutral bending line of the sidewalls.

Preferably, a section of the support adjacent to the sidewalls has a cross-sectional contour that tapers gradually toward the sidewall. The section of the support preferably has a contacting surface that extends at a slant to the reinforcement elements. Expediently, the cross-sectional contour of the section of the support tapers substantially symmetrically.

In another preferred embodiment of the present invention, the pneumatic vehicle tire preferably comprises two of the aforementioned supports positioned adjacent to one another, wherein each sidewall has coordinated therewith one of said supports, each support having a radial contact surface extending perpendicular to an axis of the vehicle tire, wherein the contact surfaces abut one another. Preferably, the supports are cemented together. The sidewalls of the tire body are fixedly connected to the supports. Preferably the sidewalls are fixedly connected with the fastening elements.

The supports expediently have radially outwardly extending projections for supporting a zenith portion of the tread during emergency operation of the vehicle tire.

In another embodiment of present invention the fastening elements are a unitary part of the support. Preferably, the fastening elements are in the form of a circumferential groove into which the reinforcement elements are inserted. The reinforcement elements are fixedly connected to the support. Preferably, the reinforcement elements are embedded into the support. Expediently, the reinforcement elements have a coating for increasing the adhesion to the support.

Preferably, a section of the support adjacent to the sidewalls has a cross-sectional contour that tapers gradually toward the sidewall. Preferably, the cross-sectional contour of the portion of the support tapers substantially symmetrically.

According to the present invention, it is suggested to arrange the fastening elements radially outwardly at the annular support structure (support) so that the reinforcement elements of the carcass have a transition without deflection from the fastening elements into the neutral bending line of the tire sidewalls. It is important in this context that the reinforcement elements at their radially inwardly positioned ends are not anchored to bead rings, but anchored such that, already upon leaving the area of the fastening elements, they have a transition into the neutral bending line of the sidewall so that they are only subjected to favorable pull and bending loads. Expediently, this suggestion may be most effectively realized with individual cords, threads, bands, etc. by anchoring these at the outer side of their fastening elements, for example, at hooks, where they are reversed in direction.

In order to take load off the abutting (contacting) surfaces between the support and the radially inwardly positioned ends of the tire sidewalls, according to a further suggestion of the invention the radially outwardly positioned portion of the support may be provided with an increasing bending elasticity in the direction toward the tire sidewall which may be achieved, for example, for a support manufactured of a stiff, non-elastic plastic material by a subsequent treatment step.

In carrying this idea further, it is also possible to embody the tire sidewalls and the supports such that they overlap in order to prevent a module step.

It is furthermore important that the present invention is not limited to the conventional supports (rims) that are provided with a wheel flange. It is possible with the present invention to anchor the individual tire sidewalls to the annular supports that in turn can be fastened in any suitable manner to a rotating part of a vehicle wheel. Furthermore, the inventive supports are favorable aids for the manufacture of the green tire and for its vulcanization in a vulcanization mode. For example, the supports in the form of rings may be integrated into the tire building machine such that they take over at least individual tasks within this manufacturing device. These tasks are fulfillable because the rigid supports in the form of an annular member (ring) allow for an exact centering and guiding. Also, the annular supports, for example, during positioning the carcass into the belt area, can be exactly held and moved. Furthermore, the supports may be provided with axial contact surfaces in order to precisely essentially arrange the supports together with the carcass within the vulcanization mold.

The present invention further relates to a device for building a green tire for a pneumatic vehicle tire made of rubber or a rubber-like compound pursuant to the inventive method, wherein the device comprises annular bodies comprised of ring segments and having an adjustable diameter, the annular bodies having circumferential grooves for receiving the support, the support serving for centering and positioning the green tire on the device.

The present invention further relates to a vulcanization mold for a green tire for a pneumatic vehicle tire made of rubber or a rubber-like compound according to the inventive method, wherein the mold comprises a molding chamber for receiving the supports, the supports delimiting in part the molding chamber.

Preferably, the molding chamber has surfaces for cooperating with centering surfaces at the supports, the centering surfaces extending parallel to an axis of the green tire.

DESCRIPTION OF THE PREFERRED EMBODIMENTS

The present invention will now be described in detail with the aid of several specific embodiments utilizing FIGS. 1 through 8.

The tire body 1 which is comprised essentially of rubber has sidewalls 2, a tread 3, a carcass 4, and a belt 5 positioned below the tread. The tire body is mirror-symmetrically installed on ring-shaped supports 6 made of metal or a stiff plastic material. The supports 6 have axial inner surfaces 7, radial contact surfaces 8 as well as a projection in the form of an angled member 9 with support surfaces 10 that are parallel to the axis of the tire and are designed to improve the performance of the tire during emergency operation (flat tire). The two supports 6 are cemented together at the two contact surfaces 8. Brackets etc., not represented, serve for fastening the two supports 6 with the tire body to other parts of the vehicle wheel. It is also possible to position the support surface 10, as indicated in dashed lines, at about one third of the inner height of the hollow interior of the tire.

At both sides of the tire the supports 6 are provided with upwardly slanted legs 11 which essentially are aligned with the neutral bending line 12 of the tire body 1, especially of the tire sidewalls 2. The carcass 4 also is arranged along this neutral bending line 12. The carcass 4 is comprised of a plurality of cord-like reinforcement elements, for example, cords 13 that are guided, for anchoring the carcass 4 at the supports 6, about the hooks 14 that are uniformly distributed over the circumference of the support 6. Preferably, these cords 13 extend radially, however, they may also be arranged in the manner of a bias-ply carcass, respectively, a carcass with crossed cords.

Figure 5:
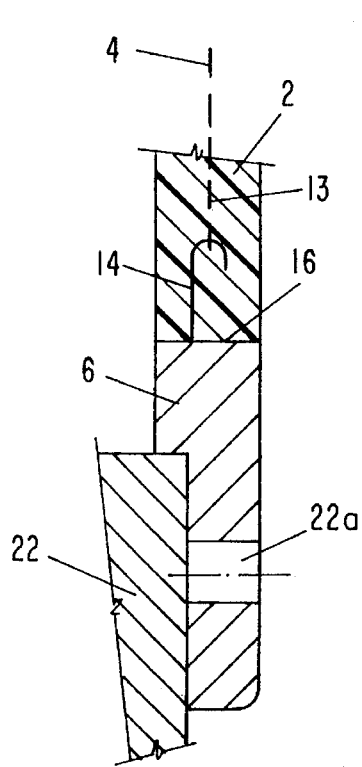
FIG. 5 shows a radial part section of a different embodiment of the support together with a portion of the corresponding vehicle tire.
Figure 6:
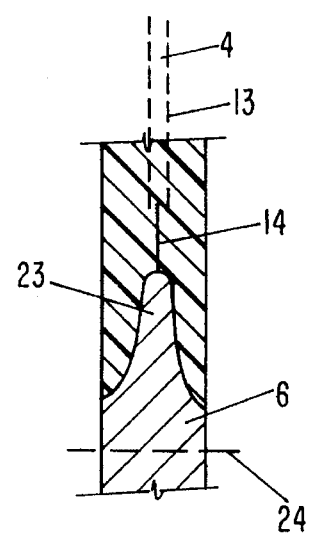
FIGS. 6 and 7 show radial part sections of the fastening zone of a tire sidewall at the support.
Figure 7:
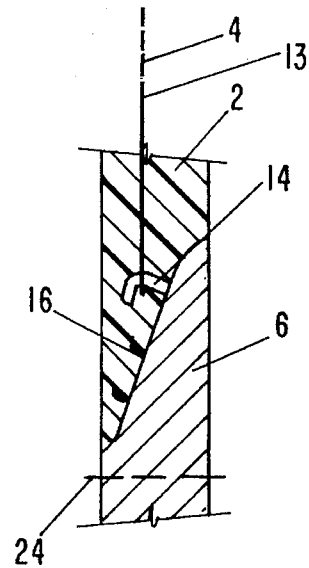

The hooks 14 connected to the supports 6 may be positioned in planes that are defined by the legs (sections) 11 (FIGS. 1, 2, 4, and 6), however, they may also be arranged in radial planes (FIGS. 5 and 7). Accordingly, the cords or threads 13 extend from the fastening elements along the neutral bending line 12 of the tire body 1 and thus are practically not subjected to pressure, respectively, sheer and torsional loads.

The rubber material at the abutting (contacting) surface 16 between the legs 11 and the tire sidewalls 2 is fixedly connected, i.e., is air-tight.

After fastening the cords 13 at the supports 6, respectively, for fastening the cords 13 at the supports 6 for building the green tire, the supports 6 are employed so as to be held in circumferential grooves 17 of preferably segmented annular bodies 18 of a tire building device in which the carcass is produced and in which also the assembly of the carcass and the zenith or crown portion (belt 5 and tread 3) can be performed. However, it should be noted that during the tire building process the rings or annular bodies 18 can be rotated relative to one another, respectively, can be axially moved relative to one another. The measures to be taken for these steps and also the treatment of the individual cords 13 are not part of the present invention. Prior art embodiments may be used for realizing this aspect of the invention.

For vulcanization of the tire body the supports 6 serve especially for centering the tire in relation to the mold halves 19 with their axial inner surfaces 7 and the slanted exterior surfaces 20 at the legs 11. The supports 6 furthermore delimits also in part the molding chamber 21 which is loaded with a pressure medium directly or with the aid of a bellows.

The support 6 according to FIG. 5 is disk-shaped and can be fastened together with the tire body 1, optionally by using screw holes 22a, to any suitable part of the wheel.

In the embodiments according to FIGS. 6 and 7 the abutting (contacting) surface 16 is modified in that it is not used for increasing the contact area, but primarily for preventing a sudden module step between the stiff support 6 and the rubber of the tire body 1. In the embodiment according to FIG. 6 the leg 11 is centrally provided with a projection 23 that tapers outwardly and at its zenith is provided with fastening elements, i.e., hooks 14 while in the embodiment according to FIG. 7 an overlap with a slanted contacting surface 16 is provided. Here the hooks 14 are arranged at approximately half the length of the surface 16.

Furthermore, it is possible to effect the aforementioned transition with material-specific properties of the supports 6 which can be employed in conjunction with the design according to FIGS. 6 and 7 or independently.

Radially outwardly of a zone that is indicated by the dashed line 24 the stiff supports 6 may be treated in a subsequent manufacturing step such that they have a greater elastic deformability in this zone, especially an increased bending ability in order to introduce a better adaptation to the deformability of the tire sidewalls 2. In this context, a gradual increase of these material properties can be provided in a gradually continuous or radially stepwise manner in the outward direction.

Figure 8:
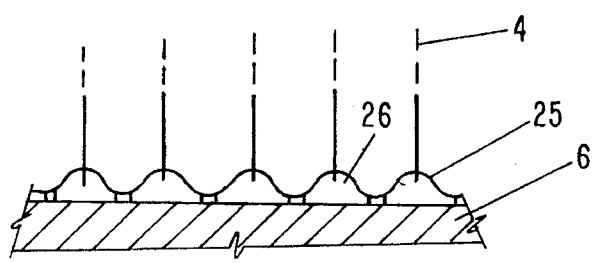
FIG. 8 shows a further embodiment of the fastening elements for the reinforcement elements of the carcass in a representation corresponding to FIG. 2.

In the embodiment according to FIG. 8 the outer circumference of the supports is provided with a wave-shaped wire 25 etc. which has a plurality of eyes 26 in the circumferential direction for guiding threads (cords) therethrough.

Instead of the hooks 14 it is possible to realize other anchoring means for the carcass 4 or its cords 13. For example, the supports 6, i.e., the support 6 of FIG. 6, may be designed at its outer circumference such that it is provided with a circumferential groove for receiving optionally coated cords 13 in order to thereby achieve a fixation of the cords 13 by adhesive forces. The cords 13 would then be held within this groove and would be anchored therein with, for example, adhesive media. This means that the parts of the support 6 which are preferably positioned at the outer circumference themselves are the fastening elements according to the present invention.

The present invention is, of course, in no way restricted to the specific disclosure of the specification and drawings, but also encompasses any modifications within the scope of the appended claims.

What we claim is:

1. A pneumatic vehicle tire made of a rubber compound, said vehicle tire comprising:

a tire body comprised of two sidewalls and a tread extending between said sidewalls;

a carcass embedded in said tire body and extending from a radially inner edge of a first said sidewall to a radially inner edge of a second said sidewall;

a belt embedded in said tire body radially inwardly relative to said tread and radially outwardly relative to said carcass;

an annular support structure with individual fastening elements positioned on said support structure so as to extend radially outwardly relative to said vehicle tire, said support structure connected to said tire body;

wherein each of said fastening elements is selected from the group consisting of a hook-shaped element and an eye-shaped element;

said carcass comprising reinforcement elements in the form of cords connected to said fastening elements;

said reinforcement elements extending substantially radially and without deflection from said fastening elements into a neutral bending line of said sidewalls;

wherein said carcass is a single-layer carcass; and wherein planes defined by said fastening elements are radial relative to said vehicle tire.

2. A pneumatic vehicle tire according to claim 1, wherein each said fastening element has only one of said reinforcement elements connected thereto.

3. A pneumatic vehicle tire according to claim 1, wherein said support structure has a section extending toward said sidewalls, with said section extending substantially aligned with said neutral bending line of said sidewalls.

4. A pneumatic vehicle tire according to claim 1, wherein a section of said support structure adjacent to said sidewalls has a cross-sectional contour that tapers gradually toward said sidewall.

5. A pneumatic vehicle tire according to claim 4, wherein said section of said support structure has a contacting surface for contacting a free end of said sidewalls of said tire body, wherein said contacting surface extends at a slant to said reinforcement elements.

6. A pneumatic vehicle tire according to claim 4, wherein said cross-sectional contour of said section of said support structure tapers substantially symmetrically.

7. A pneumatic vehicle tire according to claim 1, comprising two said support structures positioned adjacent to one another, wherein each said sidewall has coordinated therewith one said support structure, each said support structure having a radial contact surface extending perpendicular to an axis of said vehicle tire, wherein said radial contact surfaces abut one another.

8. A pneumatic vehicle tire according to claim 7, wherein said supports are cemented together with said radial contact surfaces that abut one another.

9. A pneumatic vehicle tire according to claim 7, wherein said sidewalls of said tire body are fixedly connected to said support structures.

10. A pneumatic vehicle tire according to claim 9, wherein said sidewalls are fixedly connected with said fastening elements.

11. A pneumatic vehicle tire according to claim 7, wherein said support structures have radially outwardly extending projections for supporting a zenith portion of said tread during emergency operation of said vehicle tire.

12. A pneumatic vehicle tire according to claim 1, wherein said fastening elements are a unitary part of said support structure.

13. A pneumatic vehicle tire according to claim 12, wherein a section of said support structure adjacent to said sidewalls has a cross-sectional contour that tapers gradually toward said sidewall.

14. A pneumatic vehicle tire according to claim 13, wherein said cross-sectional contour of said portion of said support structure tapers substantially symmetrically.

15. A pneumatic vehicle tire according to claim 1, wherein said reinforcement elements are fixedly connected to said support structure.

* * * * *